US00RE43409E

(19) United States
(12) Reissued Patent
Kwon

(10) Patent Number: US RE43,409 E
(45) Date of Reissued Patent: May 29, 2012

(54) REFRIGERATOR DOOR HAVING DISPENSER

(75) Inventor: Yong-Chol Kwon, Changwon (KR)

(73) Assignee: LG Electronics Inc., Seoul (KR)

(21) Appl. No.: 12/123,642

(22) Filed: May 20, 2008

Related U.S. Patent Documents

Reissue of:
(64) Patent No.: 7,340,915
Issued: Mar. 11, 2008
Appl. No.: 10/801,566
Filed: Mar. 17, 2004

(30) Foreign Application Priority Data

Mar. 22, 2003 (KR) ..... 10-2003-0018030

(51) Int. Cl.
*F25D 3/00* (2006.01)

(52) U.S. Cl. ..... 62/398; 62/441; 62/324.4; 62/500

(58) Field of Classification Search ..... 62/398, 62/324.4, 500, 338, 389, 441, 339
See application file for complete search history.

(56) References Cited

U.S. PATENT DOCUMENTS 5,096,095 A * 3/1992 Burton ..... 222/173
5,269,154 A * 12/1993 Schmidt ..... 62/275
5,359,795 A 11/1994 Mawby
5,442,933 A * 8/1995 Unger ..... 62/275
5,473,911 A * 12/1995 Unger ..... 62/344
5,474,213 A * 12/1995 Unger ..... 222/108
5,520,453 A 5/1996 Aoki
5,526,854 A 6/1996 Unger
5,715,699 A 2/1998 Coates
5,813,245 A 9/1998 Coates
5,881,930 A 3/1999 Lee
5,909,937 A 6/1999 Jenkins
6,039,219 A 3/2000 Bach
6,055,823 A 5/2000 Baker et al.
6,067,738 A 5/2000 Zeligson
(Continued)

FOREIGN PATENT DOCUMENTS

GB 2 186 311 8/1987
(Continued)

OTHER PUBLICATIONS

Non-Final Office Action issued in U.S. Appl. No. 12/394,095, mailed Jul. 6, 2010, 17 pages.

*Primary Examiner* — Frantz Jules
(74) *Attorney, Agent, or Firm* — Fish & Richardson P.C.

(57) ABSTRACT

A refrigerator door having a dispenser is disclosed. The refrigerator door includes an outer case forming a front appearance of the refrigerator door, an inner case forming a rear appearance of the refrigerator door, and an insulation layer disposed between the outer case and the inner case. First and second mounting frames are installed at both side ends of the refrigerator door and have first and second mounting slots longitudinally formed in the first and second mounting frames in opposition to each other. The dispenser is detachably coupled to a front surface of the outer case and includes a housing, which forms an external appearance of the dispenser and is formed with a recess section. An external plate section is coupled to the front surface of the outer case except for an area in which the dispenser is installed, forming an external appearance of the refrigerator door.

29 Claims, 6 Drawing Sheets

U.S. PATENT DOCUMENTS

| | | | | |
|---|---|---|---|---|
| 6,405,544 | B2 | 6/2002 | Hiraoka et al. | |
| 6,425,259 | B2 * | 7/2002 | Nelson et al. | 62/344 |
| 6,804,974 | B1 | 10/2004 | Voglewede et al. | |
| 2001/0025505 | A1 * | 10/2001 | Nelson et al. | 62/371 |
| 2003/0019236 | A1 | 1/2003 | Heims | |
| 2003/0020386 | A1 * | 1/2003 | Leimkuehler et al. | 312/405.1 |
| 2003/0024259 | A1 | 2/2003 | Jenkins | |
| 2004/0007009 | A1 | 1/2004 | Wing et al. | |
| 2005/0095152 | A1 * | 5/2005 | Dale | 417/477.2 |

FOREIGN PATENT DOCUMENTS

| | | |
|---|---|---|
| WO | WO 03/023298 | 3/2003 |

* cited by examiner

REFRIGERATOR DOOR HAVING DISPENSER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a refrigerator, and more particularly to a refrigerator door for opening or closing a storage cavity formed in a refrigerator body.

2. Description of the Prior Art

As generally known in the art, a refrigerator generates cold air through a refrigeration cycle and supplies such cold air into a refrigerating compartment and a freezing compartment to keep freshness of foodstuffs stored in the refrigerating compartment and the freezing compartment for a long period of time.

Currently available large-sized refrigerators have dispensers allowing users to draw out water or ice cubes without opening refrigerator doors. Since a user can draw out water or ice cubes through such a dispenser without opening refrigerator doors, cold air contained in a storage cavity of a large-sized refrigerator may not exhaust to an exterior and users may conveniently use the large-sized refrigerator.

FIGS. 1 and 2 show a conventional refrigerator. Referring to FIGS. 1 and 2, the conventional refrigerator includes a refrigerator body 11 having a refrigerating compartment 12 and a freezing compartment therein. A plurality of shelves 13 are provided in the refrigerating compartment 12 and the freezing compartment in such a manner that foodstuffs or articles can be placed thereon.

The refrigerating compartment 12 and the freezing compartment are opened or closed by means of doors 15 and 15'. The doors 15 and 15' are rotatably coupled to the refrigerator body 11 by means of hinge devices provided at upper and lower side edges of the refrigerator body 11.

Each of doors 15 and 15' includes an outer case 15a made from steel and an inner case 15b made from synthetic resin, forming an external appearance of the doors 15 and 15'. The inner case 15b forms a rear surface of each door. In addition, an insulation layer 15d is provided in an internal space formed between the outer case 15a and the inner case 15b.

Generally, pigments, such as paints, are coated on an outer surface of the outer case 15a so as to improve an aesthetic value of the doors 15 and 15'. Additionally, a tempered glass 17 can be attached to the doors 15 and 15'. Reference numeral 15c represents a door grip.

In addition, a dispenser 20 is provided in a front surface of the door 15 of the freezing compartment. A user can draw out water or ice cubes through the dispenser 20 without opening the doors 15 and 15' of the refrigerator. The dispenser 20 is installed in a recess 21 formed at the outer case 15a of the door 15.

The dispenser 20 includes an actuating lever 22 installed at an upper wall of the recess 21. In addition, a discharge port 24 is formed in the upper of the recess 21 adjacent to the actuating lever 22. The discharge port 24 is opened/closed according to a movement of the actuating lever 22. A water collecting section 26 is formed at a bottom wall of the recess 21 so as to collect waste water.

However, the above-mentioned conventional refrigerator door has problems as follows.

Firstly, in order to fabricate the conventional door 15, the outer case 15a is assembled with the inner case 15b by filling a foaming agent therebetween, and the tempered glass 17 is attached to the front surface of the outer case 15a. At this time, a color of the tempered glass 17 is determined to meet the demand of consumers.

However, since an external appearance of the dispenser 20 is formed by a part of the outer case 15a, the dispenser 20 has a color the same as a color of the outer case 15a. Thus, according to the conventional refrigerator door 15, it is necessary to match the color of the dispenser 20 with the color of the tempered glass 17 when fabricating the dispenser 20.

Accordingly, manufactures must fabricate the door 15 by using an outer case having the color identical to the color of the tempered glass 17, causing problems in material management and inventory management and increasing manufacturing costs.

SUMMARY OF THE INVENTION

Accordingly, the present invention has been made to solve the above-mentioned problems occurring in the prior art, and an object of the present invention is to provide a refrigerator door having a detachable dispenser.

Another object of the present invention is to easily change a color of a refrigerator door having a dispenser.

To accomplish the above objects, according to a first aspect of the present invention, there is provided a refrigerator door comprising an outer case forming a front appearance of the refrigerator door, an inner case forming a rear appearance of the refrigerator, an insulation layer formed between the outer case and the inner case, a dispenser detachably coupled to a front surface of the outer case and including a housing, which forms an external appearance of the dispenser and is formed with a recess section, and an external plate section coupled to the front surface of the outer case except for an area in which the dispenser is installed, in order to form an external appearance of the refrigerator door.

According to the preferred embodiment of the present invention, mounting frames having mounting slots are provided at both side ends of the refrigerator door, and both side ends of the external plate section are inserted into the mounting slots of the mounting frames.

A mounting bracket having a recess part corresponding to the recess section of the housing is coupled to the front surface of the outer case, and the housing is coupled to the mounting bracket by means of mounting protrusions and a protrusion receiving section formed in the housing and the mounting bracket, respectively, thereby coupling the dispenser to the outer case.

One side end of the housing is rotatably coupled to the mounting bracket.

The housing is formed at upper and lower ends thereof with insertion slots into which edge parts of the external plate section are inserted.

An actuating lever is installed in the recess section of the housing for a discharge operation of water or ice cubes from the dispenser, and a driving lever is installed rearward of the recess section so as to open/close a water port or an ice cube port according to actuating force of the actuating lever transferred thereto through an engagement bar.

The driving lever is installed at a lever resting section formed in the mounting bracket provided between a rear surface of the housing and the outer case.

The engagement bar rearwardly extends from a rear surface of the actuating lever by passing through a rear wall of the recess section and makes contact with the driving lever.

At least one guide bar is provided at the rear surface of the actuating lever and the guide bar passes through a perforated hole formed in the rear wall of the recess section in order to guide a movement of the actuating lever.

The recess section of the housing is formed at a top thereof with an opening section for allowing water or ice cubes discharged from the water port or the ice cube port to be introduced into the recess section.

According to a second aspect of the present invention, there is provided a refrigerator door comprising, an outer case forming a front appearance of the refrigerator door, an inner case forming a rear appearance of the refrigerator, an insulation layer formed between the outer case and the inner case, first and second mounting frames installed at both side ends of the refrigerator door and having first and second mounting slots longitudinally formed in the first and second mounting frames in opposition to each other, a dispenser detachably coupled to a front surface of the outer case and including a housing, which forms an external appearance of the dispenser and is formed with a recess section, and an external plate section coupled to the front surface of the outer case except for an area in which the dispenser is installed, in order to form an external appearance of the refrigerator door, wherein both side end portions of the external plate are inserted into the first and second mounting slots of the first and second mounting frames.

According to the preferred embodiment of the present invention, the disperser includes the housing forming the external appearance of the dispenser and having the recess section formed at a top thereof with an opening section, a discharge port for discharging water or ice cubes towards the recess section through the opening section of the housing, a mounting bracket installed in the outer case and coupled to the housing with a shape corresponding to a shape of the housing, an actuating lever installed in the recess section of the housing for a discharge operation of water or ice cubes, and a driving lever provided between the mounting bracket and the housing in order to open/close the discharge port according to actuating force of the actuating lever.

The housing has mounting protrusions, the mounting bracket has a protrusion receiving section corresponding to the mounting protrusions, and the housing is coupled to the mounting bracket by means of the mounting protrusions and the protrusion receiving section.

One side portion of the housing is rotatably coupled to the mounting bracket.

An engagement bar is provided between the actuating lever and a lower portion of the driving lever so as to transfer actuating force of the actuating lever to the driving lever, and at least one guide bar is integrally formed with a rear surface of the actuating lever, the guide bar being positioned in a perforated hole formed in a rear wall of the recess section of the housing.

The housing is formed at upper and lower ends thereof with insertion slots into which edge parts of the external plate section are inserted.

A water bucket is installed at a bottom of the recess section of the housing.

According to the refrigerator door having the above structure of the present invention, a user may variously select a color of the refrigerator as required by the user. In addition, if it is necessary to exchange the external plates or the dispenser, the user may simply exchange only the external plates or the dispenser without exchanging the refrigerator door.

According to a third aspect of the present invention, there is provided a refrigerator door comprising, an outer case forming a front appearance of the refrigerator door, an inner case forming a rear appearance of the refrigerator, an insulation layer formed between the outer case and the inner case, a dispenser detachably coupled to a front surface of the outer case and including a housing, which forms an external appearance of the dispenser and is formed with a recess section having an opening section for allowing water or ice cubes discharged from the water port or the ice cube port to be introduced into the recess section, and an external plate section coupled to the front surface of the outer case except for an area in which the dispenser is installed, in order to form an external appearance of the refrigerator door.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
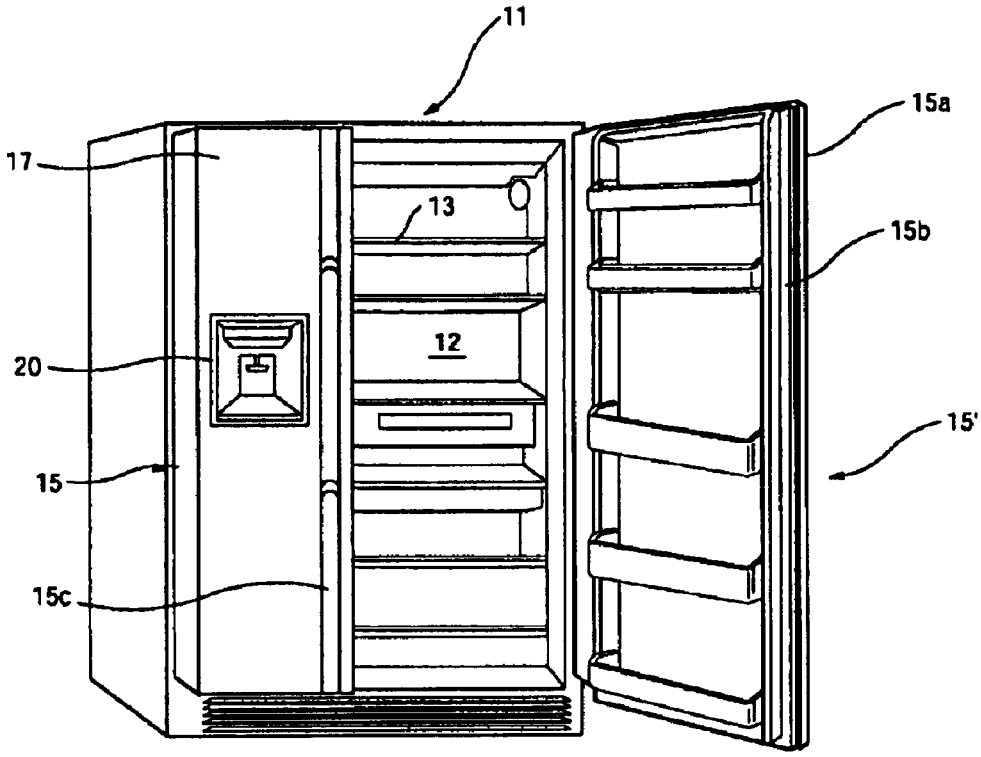
FIG. 1 is a perspective view showing an external appearance of a conventional refrigerator.
Figure 2:
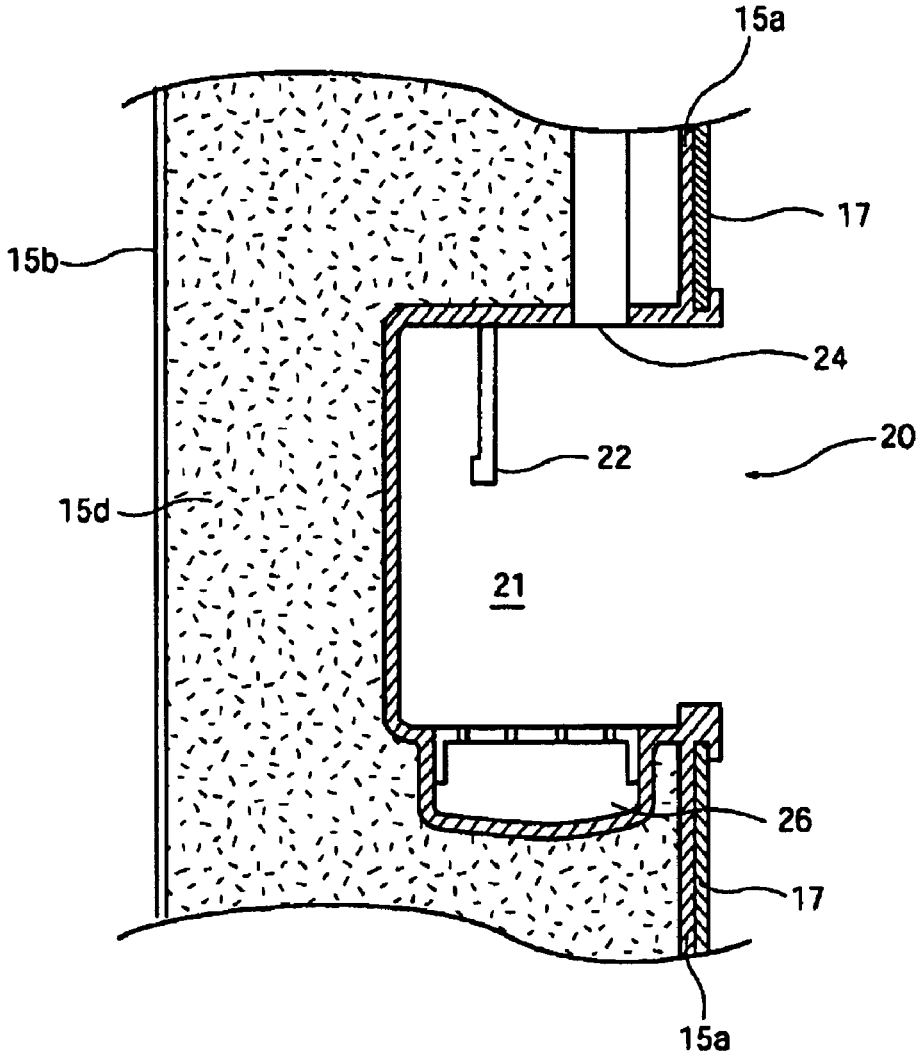
FIG. 2 is a sectional view of a dispenser provided in a conventional refrigerator.
Figure 3:
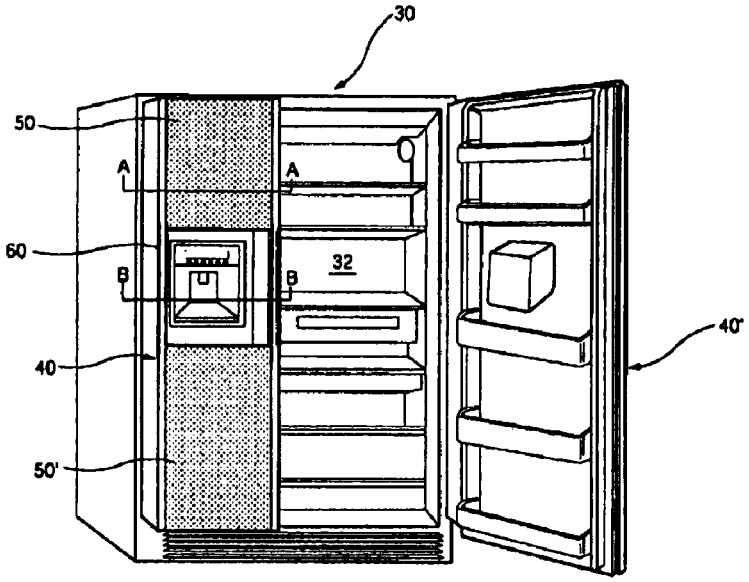
FIG. 3 is a perspective view showing a refrigerator door having a dispenser according to one embodiment of the present invention.
Figure 4:
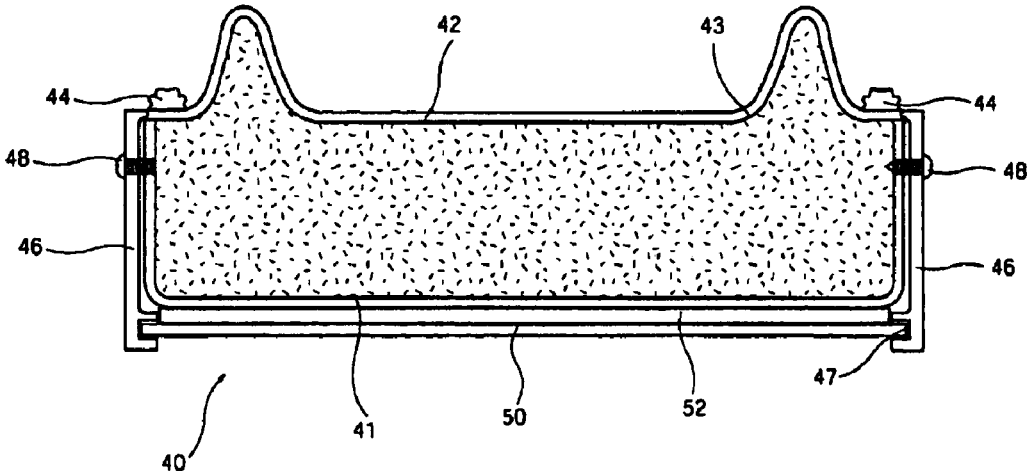
FIG. 4 is a sectional view taken along line A-A' of FIG. 3.

Hereinafter, a refrigerator door having a dispenser according to a preferred embodiment of the present invention will be described with reference to the accompanying drawings.

Referring to FIGS. 3 to 7, a refrigerator includes a refrigerator body 30 having storage cavities 32, that is a refrigerating compartment and a freezing compartment which are opened/closed by means of doors 40 and 40', respectively. According to the present embodiment, the refrigerating compartment and the freezing compartment are formed in parallel to each other in such a manner that they are opened/closed by the doors 40 and 40'. Hereinafter, the description will be made with reference to the door 40 having a dispenser 60.

The door 40 includes an outer case 41 made from metal, an inner case 42 made from synthetic resin, and an insulation layer 43 formed between the outer case 41 and the inner case 42. The outer case 41 forms an external appearance of the door 40 together with the inner case 42. The outer case 41 may form a front appearance of the door 40 and the inner case 42 may form a rear appearance of the door 40. The inner case 42 forms a part of the storage cavity 32 when the door 40 is closed. Reference numeral 44 is a gasket for sealing between a front surface of the refrigerator body 30 and the door 40.

Mounting frames 46 are longitudinally arranged at both sides of the door 40. Each of the mounting frames 46 is fixed to both sides of the door 40 by means of a coupling screw 48. However, according to another embodiment of the present invention, the mounting frames 46 can be coupled to the door 40 in various methods, for example, by forming coupling structures in the mounting frames 46 and the door 40. A mounting slot 47 is formed at a front end of each mounting frame 46. The mounting slot 47 formed in one mounting frame 46 faces the mounting slot 47 formed in the other mounting frame 46. The mounting slot 47 is formed lengthwise the mounting frame 46, that is, the mounting slot 12 is aligned in a longitudinal direction of the door 40.

External plates 50 and 50' are coupled to the mounting frame 47. The external plates 50 and 50' form the front appearance of the door 40 and are made from various finishing materials, such as a tempered glass. Both side ends of the external plates 50 and 50' are inserted into the mounting slots 47 formed in the mounting frames 46. The external plates 50 and 50' are divided into an upper external plate 50 and a lower external plate 50' about the dispenser 60 provided at a middle portion of the door 40.

Damping materials 52 can be filled between rear surfaces of the external plates 50 and 50' and the front surface of the outer case 41. The damping materials 52 are aligned in a cavity formed between the external plates 50 and 50' and the outer case 431 in order to absorb impact applied to the external plates 50 and 50'. The damping materials 52 may include sponge.

The dispenser 60 is detachably installed at the front surface of the door 40 corresponding to a position between the external plates 50 and 50'. A user can draw out water or ice cubes through the dispenser 60 without opening the door 40.

Figure 7:
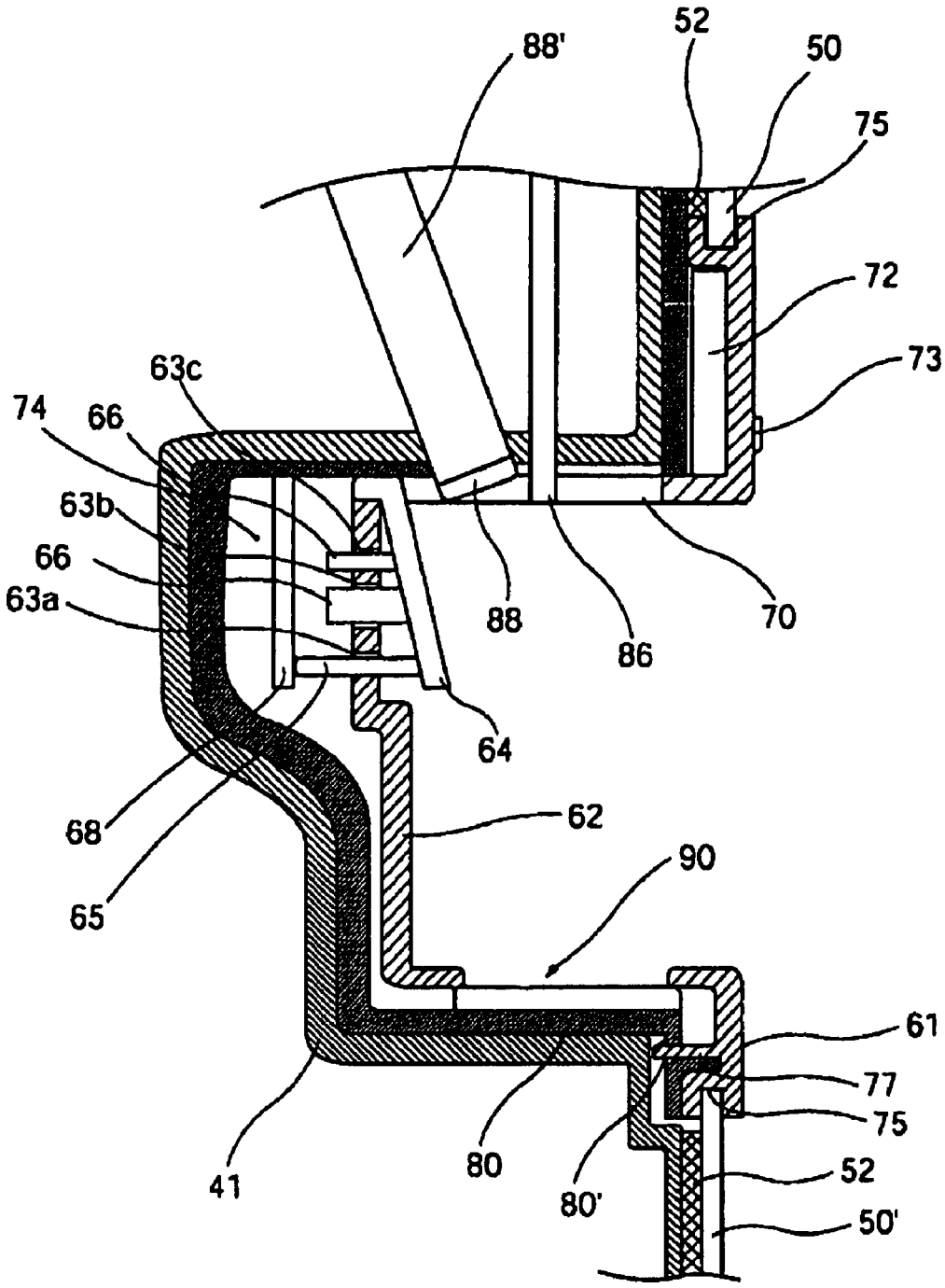
FIG. 7 is a side sectional view showing main components of a refrigerator door having a dispenser according to one embodiment of the present invention.

The dispenser 60 includes a housing 61 forming an external appearance of the dispenser 60. A lower part of the housing 61 is rearwardly depressed, thereby forming a recess section 62. The recess section 62 is rested in a recess part of the outer case 41 formed at a predetermined portion of the front surface of the outer case 41. As shown in FIG. 7, a plurality of perforated holes 63a, 63b and 63c are longitudinally formed in a rear wall of the recess section 62. The perforated holes 63a, 63b and 63c are formed at an upper portion of the rear wall of the recess section 62 in line with each other.

An actuating lever 64 is installed an inner upper portion of the recess section 62 of the housing 61. The actuating lever 64 actuates a driving lever 68, which will be described below in detail, when the user pushes the actuating lever 64 by using a cup or a vessel. The actuating lever 64 extends along an aligning direction of the perforated holes 63a, 63b and 63c by a predetermined distance.

An engagement bar 65 is protruded from a lower rear portion of the actuating lever 64. The engagement bar 65 extends through the rear wall of the recess section 62 by passing through the perforated hole 63a in order to operate the driving lever 68 when the actuating lever 64 is actuated.

Guide bars 66 are attached to a rear surface of the actuating lever 64 corresponding to the perforated holes 63b and 63c. The guide bars 66 extend in a direction identical to the extending direction of the engagement bar 65. The guide bars 66 guide a movement of the actuating lever 64. The guide bars 66 have a length shorter than a length of the engagement bar 65. At least one of the engagement bar 65 and the guide bars 66 has a rod shape and the other bars have rectangular shapes. However, shapes of the engagement bar 65 and the guide bars 66 are not limited to those shapes.

In addition, the driving lever 68 actuated by the actuating lever 64 is positioned separately from the housing 61. In detail, the driving lever 68 is installed on a lever mounting section 84 of a mounting bracket 80, which will be explained in detail later. The driving lever 68 controls an opening/closing operation of a water port 86 and an ice cube port 88 so as to allow the user to take ice cubes or water from the dispenser 60. The driving lever 68 is biased to make contact with the engagement bar 65 by means of an elastic member.

Figure 6:
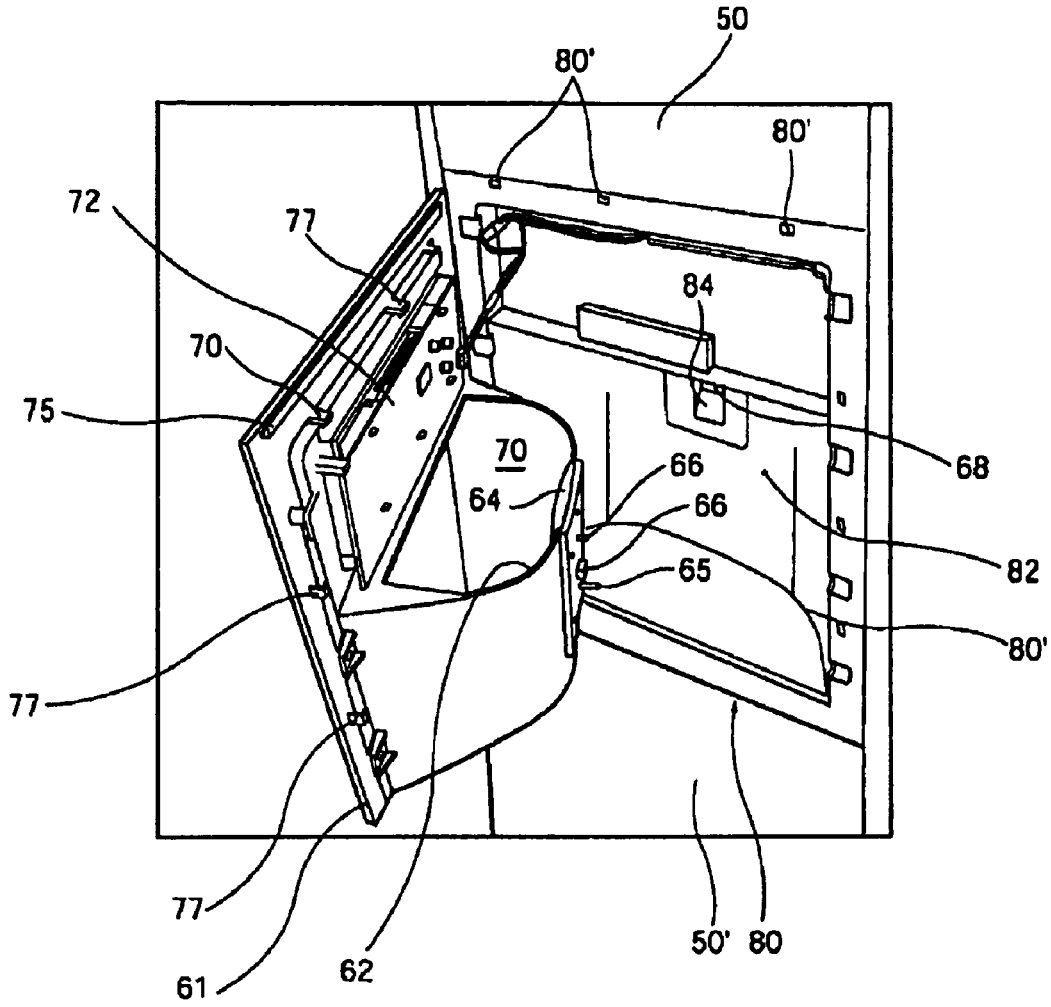
FIG. 6 is an exploded perspective view showing main components of a refrigerator door having a dispenser according to one embodiment of the present invention.

As shown in FIG. 6 in detail, an opening section 70 is formed at a top of the recess section 62 of the housing 61. Ice cubes and water discharged from the water port 86 and the ice cube port 88 are transferred to the recess section 62 through the opening section 70.

A display section 72 is installed at an upper front surface of the housing 61. The display section 72 displays information about an operation of the refrigerator. The display section 72 has a plurality of buttons 73 so that the user can control the operation of the refrigerator by handling the buttons 73.

Insertion slots 75 are formed at upper and lower ends of the housing 61 in a width direction of the housing 61. End portions of the external plates 50 and 50' are inserted into the insertion slots 75, respectively. A plurality of mounting protrusions 77 are provided along an outer peripheral portion of a rear surface of the housing 61. The mounting protrusions 77 are rearwardly protruded from the rear surface of the housing 61 and locking jaws are formed at front ends of the mounting protrusions 77.

In addition, the housing 61 is coupled to the outer case 41 by means of the mounting bracket 80. The mounting bracket 80 is fixed to the outer case 41 by means of a coupling screw. A front surface of the mounting bracket 80 is recessed corresponding to a shape of a rear portion of the housing 61. In particular, the mounting bracket 80 is formed with a recess part 82 corresponding to the recess section 62 of the housing 61. An upper portion of the recess part 82 is depressed, thereby forming the lever mounting section 84 in which the driving lever 68 is positioned. Accordingly, a two-stepped recess part is formed in the outer case 41 corresponding to the recess part 82 and the lever mounting section 84 of the mounting bracket 80. In addition, an opening section is also formed at a top of the recess part 82 of the mounting bracket 80 corresponding the opening section 70.

Front ends of the water port 86 and the ice cube port 88 downwardly extend from an internal portion of the door 40 to the opening section 70 of the housing 61. The water port 86 discharges water from a water tank contained in the refrigerator. The ice cube port 88 discharges ice cubes, which are created by a ice maker and transferred to the ice cube port 88 through an ice cube passage 88'. A solenoid device (not drown) may be provided to open/close the ice cube passage 88'.

The mounting bracket 80 is provided with a protrusion receiving section 80' corresponding to the mounting protrusions 77 of the housing 61. The housing 61 is fixedly coupled to the mounting bracket 80 due to an engagement between the protrusion receiving section 80' and the mounting protrusions 77. In addition, the housing 61 can be rotatably coupled to the mounting bracket 80 by rotatably coupling a left side portion of the housing 61 to the mounting bracket 80. In this case, the mounting protrusions 77 and the protrusion receiving section 80' must be provided at upper, lower and right sides of the housing 61 and the mounting bracket 80 except for left sides thereof. Of course, the housing 61 can be fixedly coupled to the mounting bracket 80 by means of the mounting protrusions 77 and the protrusion receiving section 80' without being rotatably coupled to the mounting bracket 80.

Although it is not illustrated in the drawings, a water bucket may be installed at a bottom of the recess part 82 of the mounting bracket 80. In this case, a bottom of the recess section 62 of the housing 61 is opened and the bottom of the recess part 82 of the mounting bracket 80 can be slightly recessed so as to accommodate the water bucket therein. That is, the water bucket may be installed in a portion represented by reference numeral 90.

Hereinafter, an operation of the refrigerator door having the dispenser according to the present invention will be described in detail.

According to the present invention, the dispenser 60 is detachably coupled to the front surface of the door 40. That is, the dispenser 60 may be separated from the door 40 by disassembling the mounting bracket 80 from the outer case 41 of the door 40. Thus, a color of the housing 61 of the dispenser 60 can be variously selected. That is, the color of the housing 61 can be selected identical to the color of the external plates 50 and 50' or the color of the housing 61 can be selected differently from the color of the external plates 50 and 50' as required by the user.

Firstly, a fabrication process for the door 40 will be simply explained. The foaming agent is filled between the outer case 41 and the inner case 42 forming the external appearance of the door 40 such that the insulation layer 43 is formed between the outer case 41 and the inner case 42, thereby fabricating a skeleton of the door 40.

Then, the dispenser 60 is installed in the door 40. In order to install the dispenser 60 in the door 40, the mounting bracket 80 formed rearward of the housing 61 is coupled to the outer case 41 by using the coupling screw and the mounting protrusions 77 of the housing 61 are inserted into the protrusion receiving section 80' of the mounting bracket 80. At this time, the housing 61 rotates about a left side portion thereof so that the rear surface of the housing 80 is rested on the front surface of the mounting bracket 80.

Figure 5:
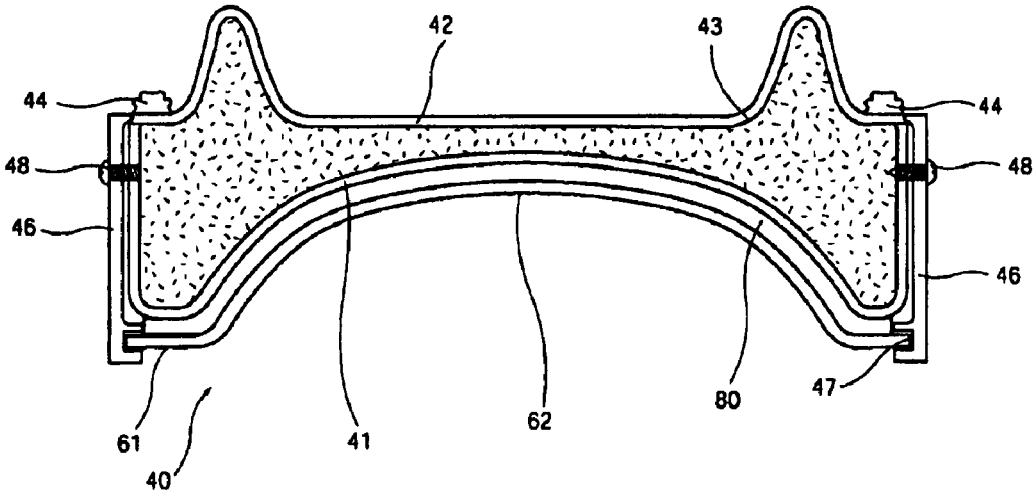
FIG. 5 is a sectional view taken along line B-B' of FIG. 3.

Then, the mounting frames 46 are installed at both sides of the door 40. At this time, as shown in FIG. 5, both side ends of the housing 61 are rested in the mounting slots 47 formed in the mounting frames 46.

In addition, the external plates 50 and 50' are assembled with the front surface of the outer case 41 of the door 40. The external plates 50 and 50' include a tempered glass. Preferably, a damping agent 52 is attached to the front surface of the outer case 41 before the external plates 50 and 50' are assembled with the front surface of the outer case 41.

The upper external plate 50 is assembled with the door 40 from the upper end of the door 40. At this time, both side ends of the upper external plate 50 move along the mounting slots 47 of the mounting frames 46. The upper external plate 50 downwardly moves along the mounting slots 47 of the mounting frames 46 until a lower end of the external plate 50 has been inserted into the insertion hole 75 formed at the upper end of the housing 61.

The lower external plate 50 is assembled with the door 40 from the lower end of the door 40. At this time, both side ends of the lower external plate 50' also move along the mounting slots 47 of the mounting frames 46 until an lower end of the external plate 50' has been inserted into the insertion hole 75 formed at the lower end of the housing 61.

The dispenser 60 and the external plates 50 and 50' are assembled with the door 40 through the above-described method. Since the external plates 50 and 50' and the dispenser 60 having the housing 61 can be assembled with the door 40 in a state in which the insulation layer 43 is formed between the outer case 41 and the inner case 42, the user can variously select the colors and materials for the external plates 50 and 50' and the dispenser 60. That is, according to the present invention, various kinds of dispensers having various colors may be selectively installed in the door as required by the user.

In addition, if it is necessary to exchange the external plates 50 and 50' or the dispenser 60, the user may simply exchange only the external plates 50 and 50' or the dispenser 60 without exchanging the door 40.

Hereinafter, a discharge process for water and ice cubes from the dispenser 60 will be explained. When the user pushes a lower portion of the actuating lever 64 by using a hand or a cup, water is discharged from the water port 86. This is because the engagement bar 65 provided at the rear surface of the actuating level 64 pushes the driving lever 68 so that the driving lever 68 opens the water port 86. That is, when the engagement bar 65 pushes the driving lever 68, the driving lever 68 opens the water port 86 so that water is discharged from the water port 86. The movement of the actuating lever 64 is guided by means of the guide bars 66. In addition, when the user releases force applied to the actuating lever 64, the driving lever 68 returns to its initial position by means of the elastic member. Accordingly, the actuating lever 64 also returns to its initial position.

Water or ice cubes are selectively discharged from the dispenser 60 by handling one of the buttons 73. That is, the user can select water or ice cubes by manipulating one of the buttons 73. In this state, if the user pushes the actuating lever 64, water or ice cubes are discharged from the water port 86 or the ice cube port 88.

Although a preferred embodiment of the present invention has been described for illustrative purposes, those skilled in the art will appreciate that various modifications, additions and substitutions are possible, without departing from the scope and spirit of the invention as disclosed in the accompanying claims.

For example, the installation status of the dispenser in the door may be variously selected.

In addition, although the above-described embodiment illustrates that the upper and lower ends of the external plates 50 and 50' are inserted into the insertion slots 75, such insertion holes 75 may be formed in upper and lower ends of the mounting bracket 80.

As described above, the refrigerator door having the dispenser according to the present invention has advantages as follows.

Firstly, since the dispenser is detachably coupled to the door, the color or material for the external plates and the dispenser can be variously selected as required by the user. That is, after fabricating a plurality of skeletons of the doors by forming the insulation layer between the outer case and the inner case, various kinds of the dispensers and the external plates forming the external appearance of the door may by selectively assembled with the doors to meet the demand of consumers. Accordingly, the manufacturers can carry out material management and inventory management for the door manufacture in a simple manner.

In addition, since the user may easily change the color of the refrigerator door, the user can utilize the refrigerator door for the purpose of interior decoration.

Furthermore, if the dispenser malfunctions or the external plates are broken, the user may easily exchange the dispenser or the external plates without exchanging the door, so the user can maintain and repair the door at a low cost.

What is claimed is:

1. A refrigerator door, comprising:

an outer case forming a front appearance of the refrigerator door;

an inner case forming a rear appearance of the refrigerator door;

an insulation layer disposed between the outer case and the inner case;

a dispenser detachably coupled to a front surface of the outer case and including a housing, which forms an external appearance of the dispenser and is formed with a recess section; and an external plate section removably coupled to the front surface of the outer case except for an area in which the dispenser is installed, in order to form an external appearance of the refrigerator door, [wherein at least both sides of the external plate section are removably coupled to the outer case, and] wherein mounting frames having mounting slots are provided at both side ends of the refrigerator door, and both side ends of the external plate section are inserted into the mounting slots of the mounting frames.

2. A refrigerator door, comprising:

an outer case forming a front appearance of the refrigerator door;

an inner case forming a rear appearance of the refrigerator door;

an insulation layer formed between the outer case and the inner case;

a dispenser detachably coupled to a front surface of the outer case and including a housing, which forms an external appearance of the dispenser and is formed with a recess section; and an external plate section coupled to the front surface of the outer case except for an area in which the dispenser is installed, in order to form an external appearance of the refrigerator door, wherein a mounting bracket having a recess part corresponding to the recess section of the housing is coupled to the front surface of the outer case, and the housing is coupled to the mounting bracket by means of mounting protrusions and a protrusion receiving section formed in the housing and the mounting bracket, respectively, thereby coupling the dispenser to the outer case.

3. The refrigerator door as claimed in claim 2, wherein one side end of the housing is rotatably coupled to the mounting bracket.

4. The refrigerator door as claimed in claim 3, wherein the housing is formed at upper and lower ends thereof with insertion slots into which edge parts of the external plate section are inserted.

5. The refrigerator door as claimed in claim 1, wherein an actuating lever is installed in the recess section of the housing for a discharge operation of water or ice cubes from the dispenser, and a driving lever is installed rearward of the recess section so as to open/close a water port or an ice cube port according to actuating force of the actuating lever transferred thereto through an engagement bar.

6. A refrigerator door, comprising:

an outer case forming a front appearance of the refrigerator door;

an inner case forming a rear appearance of the refrigerator door;

an insulation layer formed between the outer case and the inner case;

a dispenser detachably coupled to a front surface of the outer case and including a housing, which forms an external appearance of the dispenser and is formed with a recess section; and an external plate section coupled to the front surface of the outer case except for an area in which the dispenser is installed, in order to form an external appearance of the refrigerator door, wherein an actuating lever is installed in the recess section of the housing for a discharge operation of water or ice cubes from the dispenser, and a driving lever is installed rearward of the recess section so as to open/close a water port or an ice cube port according to actuating force of the actuating lever transferred thereto through an engagement bar, and wherein the driving lever is installed at a lever resting section formed in the mounting bracket provided between a rear surface of the housing and the outer case.

7. A refrigerator door, comprising:

an outer case forming a front appearance of the refrigerator door;

an inner case forming a rear appearance of the refrigerator door;

an insulation layer formed between the outer case and the inner case;

a dispenser detachably coupled to a front surface of the outer case and including a housing, which forms an external appearance of the dispenser and is formed with a recess section; and an external plate section coupled to the front surface of the outer case except for an area in which the dispenser is installed, in order to form an external appearance of the refrigerator door, wherein an actuating lever is installed in the recess section of the housing for a discharge operation of water or ice cubes from the dispenser, and a driving lever is installed rearward of the recess section so as to open/close a water port or an ice cube port according to actuating force of the actuating lever transferred thereto through an engagement bar, and wherein the engagement bar rearwardly extends from a tear surface of the actuating lever by passing through a rear wall of the recess section and makes contact with the driving lever.

8. The refrigerator door as claimed in claim 5, wherein at least one guide bar is provided at the rear surface of the actuating lever and the guide bar passes through a perforated hole formed in the rear wall of the recess section in order to guide a movement of the actuating lever.

9. The refrigerator door as claimed in claim 5, wherein the recess section of the housing is formed at a top thereof with an opening section for allowing water or ice cubes discharged from the water port or the ice cube port to be introduced into the recess section.

10. A refrigerator door, comprising:

an outer case forming a front appearance of the refrigerator door;

an inner case forming a rear appearance of the refrigerator door;

an insulation layer formed between the outer case and the inner case;

first and second mounting frames installed at both side ends of the refrigerator door and having first and second mounting slots longitudinally formed in the first and second mounting frames in opposition to each other;

a dispenser detachably coupled to a front surface of the outer case and including a housing, which forms an external appearance of the dispenser and is formed with a recess section, both ends of the dispenser being inserted into the first and second mounting slots; and an external plate section coupled to the front surface of the outer case except for an area in which the dispenser is installed, in order to form an external appearance of the refrigerator door, both side end portions of the external plate being inserted into the first and second mounting slots of the first and second mounting frames.

11. The refrigerator door as claimed in claim 10, wherein the disperser includes the housing forming the external appearance of the dispenser and having the recess section formed at a top thereof with an opening section, a discharge port for discharging water or ice cubes towards the recess section through the opening section of the housing, a mounting bracket installed in the outer case and coupled to the housing with a shape corresponding to a shape of the housing, an actuating lever installed in the recess section of the housing for a discharge operation of water or ice cubes, and a driving lever provided between the mounting bracket and the housing in order to open/close the discharge port according to actuating force of the actuating lever.

12. The refrigerator door as claimed in claim 11, wherein the housing has mounting protrusions, the mounting bracket has a protrusion receiving section corresponding to the mounting protrusions, and the housing is coupled to the mounting bracket by means of the mounting protrusions and the protrusion receiving section.

13. The refrigerator door as claimed in claim 12, wherein one side portion of the housing is rotatably coupled to the mounting bracket.

14. The refrigerator door as claimed in claim 11, wherein an engagement bar is provided between the actuating lever and a lower portion of the driving lever so as to transfer actuating force of the actuating lever to the driving lever, and at least one guide bar is integrally formed with a rear surface of the actuating lever, the guide bar being positioned in a perforated hole formed in a rear wall of the recess section of the housing.

15. The refrigerator door as claimed in claim 11, wherein the housing is formed at upper and lower ends thereof with insertion slots into which edge parts of the external plate section are inserted.

16. The refrigerator door as claimed in claim 11, further comprising a water bucket installed at a bottom of the recess section of the housing.

17. A refrigerator door, comprising:

an outer case forming a front appearance of the refrigerator door;

an inner case forming a rear appearance of the refrigerator door;

an insulation layer formed between the outer case and the inner case;

a dispenser detachably coupled to a front surface of the outer case and including a housing, which forms an external appearance of the dispenser and is formed with a recess section having an opening section for allowing water or ice cubes discharged from the water port or the ice cube port to be introduced into the recess section; and an external plate section coupled to the front surface of the outer case except for an area in which the dispenser is installed, in order to form an external appearance of the refrigerator door, wherein a mounting bracket having a recess part corresponding to the recess section of the housing is coupled to the front surface of the outer case, and the housing is coupled to the mounting bracket by means of mounting protrusions and a protrusion receiving section formed in the housing and the mounting bracket, respectively, thereby coupling the dispenser to the outer case, and the mounting bracket having an opening section formed at a top of the recess part of corresponding the opening section of the housing.

18. A refrigerator door, comprising:

an outer case forming a front appearance of the refrigerator door;

an inner case forming a rear appearance of the refrigerator door;

an insulation layer formed between the outer case and the inner case;

a dispenser detachably coupled to a front surface of the outer case and including a housing, which forms an external appearance of the dispenser and is formed with a recess section having an opening section for allowing water or ice cubes discharged from the water port or the ice cube port to be introduced into the recess section; and an external plate section coupled to the front surface of the outer case except for an area in which the dispenser is installed, in order to form an external appearance of the refrigerator door, wherein the housing is formed at upper and lower ends thereof with insertion slots into which edge parts of the external plate section are inserted.

19. A refrigerator door, comprising:

an outer case forming a front appearance of the refrigerator door;

an inner case forming a rear appearance of the refrigerator door;

an insulation layer formed between the outer case and the inner case;

a dispenser detachably coupled to a front surface of the outer case and including a housing, which forms an external appearance of the dispenser and is formed with a recess section having an opening section for allowing water or ice cubes discharged from the water port or the ice cube port to be introduced into the recess section; and an external plate section coupled to the front surface of the outer case except for an area in which the dispenser is installed, in order to form an external appearance of the refrigerator door, wherein an actuating lever is installed in the recess section of the housing for a discharge operation of water or ice cubes from the dispenser, and a driving lever is installed rearward of the recess section so as to open/close a water port or an ice cube port according to actuating force of the actuating lever transferred thereto through an engagement bar, and wherein the driving lever is installed at a lever resting section formed in the mounting bracket provided between a rear surface of the housing and the outer case.

20. A refrigerator door, comprising:

an outer case forming a front appearance of the refrigerator door;

an inner case forming a rear appearance of the refrigerator door;

an insulation layer formed between the outer case and the inner case;

a dispenser detachably coupled to a front surface of the outer case and including a housing, which forms an external appearance of the dispenser and is formed with a recess section having an opening section for allowing water or ice cubes discharged from the water port or the ice cube port to be introduced into the recess section; and an external plate section coupled to the front surface of the outer case except for an area in which the dispenser is installed, in order to form an external appearance of the refrigerator door, wherein an actuating lever is installed in the recess section of the housing for a discharge operation of water or ice cubes from the dispenser, and a driving lever is installed rearward of the recess section so as to open/close a water port or an ice cube port according to actuating force of the actuating lever transferred thereto through an engagement bar, and wherein the engagement bar rearwardly extends from a rear surface of the actuating lever by passing through a rear wall of the recess section and makes contact with the driving lever.

21. A refrigerator door, comprising:

an outer case forming a front appearance of the refrigerator door;

an inner case forming a rear appearance of the refrigerator door;

an insulation layer formed between the outer case and the inner case; and a dispenser detachably coupled to a front surface of the outer case and including a housing, which forms an external appearance of the dispenser and is formed with a recess section, wherein a mounting bracket having a recess part corresponding to the recess section of the housing is coupled to the outer case, and the housing is coupled to the mounting bracket by means of mounting protrusions and a protrusion receiving section formed in the housing and the mounting bracket, respectively, thereby coupling the dispenser to the outer case.

22. The refrigerator door as claimed in claim 21, wherein one side end of the hosing is rotatably coupled to the mounting bracket.

23. The refrigerator door as claimed in claim 21, wherein an actuating lever is installed in the recess section of the housing for a discharge operation of water or ice cubes from the dispenser, and a driving lever is installed rearward of the recess section so as to open/close a water port or an ice cube port according to actuating force of the actuating lever transferred thereto through an engagement bar.

24. The refrigerator door as claimed in claim 23, wherein the driving lever is installed at a lever resting section formed in the mounting bracket provided between a rear surface of the housing and the outer case.

25. The refrigerator door as claimed in claim 23, wherein the engagement bar rearwardly extends from a rear surface of the actuating lever by passing through a rear wall of the recess section and makes contact with the driving lever.

*26. A refrigerator door, comprising:*

*an outer case forming a front appearance of the refrigerator door;*

*an inner case forming a rear appearance of the refrigerator door;*

*an insulation layer formed between the outer case and the inner case; and*

*a dispenser coupled to a front surface of the outer case and including a housing, which forms an external appearance of the dispenser and is formed with a recess section, wherein a mounting bracket having a recess part corresponding to the recess section of the housing is coupled to the outer case, and the housing is coupled to the mounting bracket by means of mounting protrusions and a protrusion receiving section formed in the housing and the mounting bracket, respectively, thereby coupling the dispenser to the outer case,*

*wherein an actuating lever is installed in the recess section of the housing for a discharge operation of water or ice cubes from the dispenser, and a driving lever is installed rearward of the recess section so as to open/close a water port or an ice cube port according to actuating force of the actuating lever transferred thereto through an engagement bar, and*

*wherein the driving lever is installed at a lever resting section formed in the mounting bracket provided between a rear surface of the housing and the outer case.*

*27. A refrigerator door, comprising:*

*an outer case forming a front appearance of the refrigerator door;*

*an inner case forming a rear appearance of the refrigerator door;*

*an insulation layer formed between the outer case and the inner case; and*

*a dispenser coupled to a front surface of the outer case and including a housing, which forms an external appearance of the dispenser and is formed with a recess section, wherein a mounting bracket having a recess part corresponding to the recess section of the housing is coupled to the outer case, and the housing is coupled to the mounting bracket by means of mounting protrusions and a protrusion receiving section formed in the housing and the mounting bracket, respectively, thereby coupling the dispenser to the outer case,*

*wherein an actuating lever is installed in the recess section of the housing for a discharge operation of water or ice cubes from the dispenser, and a driving lever is installed rearward of the recess section so as to open/close a water port or an ice cube port according to actuating force of the actuating lever transferred thereto through an engagement bar, and*

*wherein the engagement bar rearwardly extends from a rear surface of the actuating lever by passing through a rear wall of the recess section and makes contact with the driving lever.*

*28. A refrigerator door, comprising:*

*an outer case forming a front appearance of the refrigerator door;*

*an inner case forming a rear appearance of the refrigerator door;*

*an insulation layer formed between the outer case and the inner case; and*

*a dispenser coupled to a front surface of the outer case and including a housing, which forms an external appearance of the dispenser and is formed with a recess section, wherein a mounting bracket having a recess part corresponding to the recess section of the housing is coupled to the outer case, and the housing is coupled to the mounting bracket by mounting protrusions and a protrusion receiving section formed in the housing and the mounting bracket, respectively, thereby coupling the dispenser to the outer case,*

*wherein an actuating lever is installed in the recess section of the housing for a discharge operation of water or ice cubes from the dispenser, and a driving lever is installed rearward of the recess section so as to open/close a water port or an ice cube port according to actuating force of the actuating lever transferred thereto through an engagement bar, and*

*wherein the driving lever is installed at a lever resting section formed in the mounting bracket provided between a rear surface of the housing and the outer case.*

*29. A refrigerator door, comprising:*

*an outer case forming a front appearance of the refrigerator door;*

*an inner case forming a rear appearance of the refrigerator door;*

*an insulation layer formed between the outer case and the inner case; and*

*a dispenser coupled to a front surface of the outer case and including a housing, which forms an external appearance of the dispenser and is formed with a recess section, wherein a mounting bracket having a recess part corresponding to the recess section of the housing is coupled to the outer case, and the housing is coupled to the mounting bracket by mounting protrusions and a protrusion receiving section formed in the housing and the mounting bracket, respectively, thereby coupling the dispenser to the outer case,*

*wherein an actuating lever is installed in the recess section of the housing for a discharge operation of water or ice cubes from the dispenser, and a driving lever is installed rearward of the recess section so as to open/close a water port or an ice cube port according to actuating force of the actuating lever transferred thereto through an engagement bar, and*

*wherein the engagement bar rearwardly extends from a rear surface of the actuating lever by passing through a rear wall of the recess section and makes contact with the driving lever.*

* * * * *